US005624650A

United States Patent [19]
McEwan et al.

[11] Patent Number: 5,624,650
[45] Date of Patent: Apr. 29, 1997

[54] NITRIC ACID PROCESS FOR FERRIC SULFATE PRODUCTION

[75] Inventors: Thomas D. McEwan; William E. Pfaffenberger, both of Victoria, Canada

[73] Assignee: Environchip Technologies, Inc., Victoria, Canada

[21] Appl. No.: 605,629

[22] Filed: Feb. 22, 1996

[51] Int. Cl.$^6$ .............................. C01G 49/00; C01G 49/14
[52] U.S. Cl. ...................... 423/558; 423/146; 423/150.1; 423/150.3
[58] Field of Search ................... 423/146, 150.1, 423/150.4, 558, 150.3

[56] References Cited

U.S. PATENT DOCUMENTS

| | | | |
|---|---|---|---|
| 2,196,584 | 4/1940 | Edison | 423/558 |
| 2,252,332 | 8/1941 | Plummer | 23/126 |
| 3,888,748 | 6/1975 | Brennecke | 204/108 |
| 3,910,636 | 10/1975 | Hard | 299/5 |
| 3,912,330 | 10/1975 | Carnahan et al. | 299/4 |
| 5,188,713 | 2/1993 | O'Brien et al. | 204/106 |
| 5,286,465 | 2/1994 | Zaromb et al. | 423/106 |
| 5,453,253 | 9/1995 | von Röpenack et al. | 423/138 |

FOREIGN PATENT DOCUMENTS

247655A1 7/1987 German Dem. Rep. .
9465656 3/1994 Japan .

OTHER PUBLICATIONS

Kershaw, M.G. et al., "The Jarosite Process–Phase Equilibria," *LEAD–ZINC–TIN '80*, Proceedings of a World Symposium on Metallurgy and Environment Control sponsored by the TMS–AIME Lead, Zinc, and Tin Committee at the 109th AIME Annual Meeting, Feb. 24–28, 1980, in Las Vegas, pp. 565–580.

Haigh, C.J., "The Hydrolysis of Iron in Acid Solutions," *Proc. Aust. Inst. Min. Met.*, Sep. 1967, pp. 49–56.

*Primary Examiner*—Gary P. Straub
*Assistant Examiner*—Timothy C. Vanoy
*Attorney, Agent, or Firm*—Seed and Berry LLP

[57] ABSTRACT

Ferric sulfate is produced by treating ferric ammonium sulfate, ammonium jarosite or a similar iron complex with nitric acid. The ferric ammonium sulfate or ammonium jarosite can be formed by treating a sulfuric acid leaching solution, e.g., a solution used to leach zinc or copper ore concentrate, with a solution of ammonium nitrate. Thereafter, upon addition of dilute nitric acid at a temperature of about 60° C., ferric sulfate forms and is recovered.

38 Claims, No Drawings

NITRIC ACID PROCESS FOR FERRIC SULFATE PRODUCTION

TECHNICAL FIELD

The present invention relates generally to a process for preparing ferric sulfate, and, more specifically, to treatment of ferric ammonium sulfate or ammonium jarosite with nitric acid to generate ferric sulfate.

BACKGROUND OF THE INVENTION

Ferric sulfate ($Fe_2(SO_4)_3$) is a commonly used material of commerce. It finds use in, for example, potable water and sewage treatment processes, where it acts as a flocculant to remove suspended particles in the water. Furthermore, ferric sulfate is a useful precursor to other commonly used materials of commerce. For example, roasting of ferric sulfate yields ferric oxide and sulfur trioxide gas, while hydration of sulfur trioxide gas yields sulfuric acid.

Ferric sulfate has been produced from many materials under a wide range of conditions. For example, various metal-containing byproduct streams from smelting ("flue dust"; see, e.g., U.S. Pat. No. 2,252,332) and steel manufacture ("baghouse dust"; see, e.g., U.S. Pat. No. 5,286,465) may be reacted with sulfuric acid to generate ferric sulfate. However, there is a need in the art for a more efficient, less expensive ferric sulfate manufacturing process.

In addition, there is a need in the art for processes that convert or otherwise consume chemical byproduct streams to provide useful materials under economical conditions. For example, ore roasting was once a very widely used process for metal recovery. However, ore roasting generates various pollutants, such as sulfur dioxide, and therefore this process is in disfavor. The lixiviation or leaching (i.e., selective dissolution) of metal bearing mineral materials by hydrometallurgical techniques has become a popular alternative to ore roasting, because roasting gases such as sulfur dioxide are not normally produced in leaching processes. In a typical leaching process, the feedstock having the metal(s) of interest is exposed to reactive solutions, thereby achieving a purification of the feedstock.

However, ore leaching also suffers from certain drawbacks, for example, the leaching solutions have to be disposed of and/or utilized in some way. The leaching solutions are typically acid-containing and corrosive, thus are difficult to dispose of and are expensive to replace. In addition, the leaching solutions often contain valuable metals, which are desirably recovered. Electrowinning is a process whereby leaching solutions can be treated to isolate the valuable metals therefrom. However, when iron is present in the leaching solution, it causes problems for the electrowinning process, particularly when the iron concentration is greater than about 3 g/liter.

A traditional approach to recovering useful metals from iron-containing acidic aqueous leaching solutions is through addition of an alkali to the leaching solution, to thereby precipitate ferric ions as hydroxides. However, this conventional precipitation method requires the separation of hydroxides, which are difficult to filter from the liquid phase.

There is thus a need in the art for improved processes to produce ferric sulfate, and processes that can remove iron from leaching solutions to allow these solutions to be used in electrowinning. The process of the present invention fulfills each of these needs, and provides other related advantages.

SUMMARY OF THE INVENTION

In brief, the invention provides a method for producing ferric sulfate. The method comprises contacting (i) an iron complex comprising ions of iron, ammonium and sulfate, with (ii) nitric acid, to thereby form ferric sulfate.

The invention is useful as part of a process for leaching metal from ore concentrate with a sulfuric acid leaching solution, where the leaching solution contains at least one of ferric ammonium sulfate and ammonium jarosite. In such a process, nitric acid is added to the leaching solution to thereby form ferric sulfate.

DETAILED DESCRIPTION OF THE INVENTION

The method of the invention is directed to the formation of ferric sulfate ($Fe_2(SO_4)_3$) from nitric acid and at least one salt, complex or compound formed from ionic forms of iron, ammonium and sulfate (hereinafter "iron complex"). The iron ion may be either ferrous ion ($Fe^{+2}$) or ferric ion ($Fe^{+3}$). The ammonium ion has the formula $NH_4^+$, while the sulfate ion has the formula $SO_4^=$. Exemplary iron complexes suited for the process of the invention include, without limitation, ferric ammonium sulfate ($FeNH_4(SO_4)_2$) and ammonium jarosite ($NH_4Fe_3(OH)_6(SO_4)_2$).

The iron complex of the invention may consist entirely of a single iron complex, or may consist of a mixture of iron complexes. In addition, the iron complex may be in combination with other materials. For example, the iron complex may be dissolved in water to form an aqueous solution. According to a preferred process, nitric acid is added to mixture of non-aqueous iron complex and an aqueous solution of iron complex having a pH of less than 7, (i.e., an acidic aqueous solution). Sulfuric acid is a preferred acid to have present in the aqueous solution to thereby lower the pH of the solution.

The iron complex may be either present within, or formed from components of ore or ore concentrate, as used in mining operations. For example, jarosites are crystalline compounds of the general formula $MFe_3(OH)_6(SO_4)_2$ where M designates a cation, either sodium potassium or ammonium. All of these three jarosites are found in nature, typically as sand-like crystals having yellow or yellow-brown color. Thus, the iron complex may be naturally-occurring ammonium jarosite, or formed from sodium or potassium jarosite. In addition, chalcopyrite is a preferred ore which may be used in the inventive process.

Thus, the iron complex may be in contact with materials present in ore. A preferred ore concentrate contains iron in addition to at least one other metal, (e.g., zinc or copper) at a concentration of about 25 weight percent to about 50 weight percent. Suitable ore concentrates are described in, for example, U.S. Pat. No. 5,188,713, where the entire disclosure thereof is incorporated herein by reference. U.S. Pat. No. 5,188,713 discloses the use of ammonium nitrate to produce ammonium jarosite from jarosite.

When the iron complex is part of an ore or ore concentrate, such an ore or ore concentrate is preferably in a crushed form of a sufficiently small size that nitric acid solution is able to reach the metallic-mineral particles contained in the ore. A size of 200–400 mesh is satisfactory. The nitric acid may be contacted with the solid ore or ore concentrate by a standard lixiviation procedure known in the art. For example, the nitric acid may be circulated through a stationary crushed ore mass in a process commonly known as percolation. The rate of percolation will depend on a number of factors, such as the particle size of the ore, the depth of the crushed ore mass, the strength of the nitric acid solution and the quantity of nitric acid solution being percolated through a specified quantity of ore mass. Optimization of these parameters is well within the expertise of one of ordinary skill in the art. The nitric acid solution may be sprayed onto the ore mass, and gutters positioned under the ore mass may recover and allow recycling of the nitric acid solution.

The nitric acid is preferably a dilute aqueous solution of nitric acid, having a concentration of about 0.2M to about 5M, preferably about 0.7M to about 1.5M.

The inventive process calls for nitric acid to be contacted with an iron complex as defined above. In this way, the iron complex is convened to ferric sulfate, with oxidation of the ammonium groups to various nitrogen oxides. It has been found that the combination of nitric acid and iron complex results in a chemical reaction during which the ammonium ions of the iron complex are oxidized. The product of this oxidation includes various nitrogen oxides, including nitric oxide (NO), nitrogen dioxide ($NO_2$), dinitrogen tetroxide ($N_2O_4$). Such nitrogen oxides may be recovered from the product mixture, and thereafter converted back to nitric acid by techniques well known in the art. A valuable aspect of the present invention is that the byproducts of the inventive process can be recovered and recycled to provide nitric acid.

Some leaching solutions which contain iron complex may additionally contain nitrate ion ($NO_3^-$) or other nitrogen species. However, nitrate ion may be converted to nitric acid, and thus will not interfere with either the formation of ferric sulfate or recycling of nitrogen oxides to form nitric acid. This is a valuable aspect of the invention, particularly when the iron complex is a product from leaching a copper concentrate.

The iron complex and nitric acid are suitably contacted at a temperature of about 10° C. to about 150° C., preferably at an elevated temperature of about 30° C. to about 100° C., and more preferably at a temperature of about 60° C. to about 80° C. The elevated reaction temperature is preferred in order to obtain an enhanced reaction rate for ferric sulfate formation. In addition to an elevated reaction temperature, it is preferred to contact the nitric acid with the iron complex under agitation. In other words, the mixture of nitric acid and iron complex should be stirred, shaken or otherwise mechanically mixed in some manner.

As stated above, the iron complex may be either part of or formed from an ore or ore concentrate. A preferred process of the invention forms the iron complex from an ore concentrate, beginning with the process described in U.S. Pat. No. 5,188,713, as described next. According to a first step of a preferred process of the invention, ore concentrate containing about 25–50 weight percent copper or zinc, but also containing iron, is contacted with sulfuric acid leaching solution. Such ore concentrate is commercially available from a number of sources, including Westman Resources, Myra Falls, British Columbia, Canada. In these ore concentrates, the zinc and/or copper are typically in the form of zinc sulfide and/or copper sulfide. In order to allow the sulfuric acid to reach the metal deposits in the ore concentrate, the ore concentrate preferably has a mesh size of about 200 to about 400, and more preferably of about 200 to about 300. The sulfuric acid solution is preferably at least about 80% concentration in water, more preferably at least about 85%. Such concentrated sulfuric acid is a commodity chemical, available from many suppliers.

The ore concentrate is contacted with the sulfuric acid solution at a temperature and for a time sufficient to achieve substantially complete conversion of the metals and metal complexes in the ore concentrate (e.g., metal sulfides) into metal sulfates. Thus, this first step of a preferred inventive process forms an acid solution of metal sulfates. A temperature of about 195° C. to about 210° C. is preferred, and within this temperature range a contact time of about 5 to about 25 minutes, and preferably about 15 to 20 minutes is suitable. At this temperature, a condenser is preferably employed to recover vapor escaping from the reaction vessel and condense that vapor. The condensed vapor can be returned to the reaction vessel. Agitation is preferably supplied while sulfuric acid is leaching metals from the ore concentrate.

The reaction of ore concentrate with sulfuric acid can be run on small or very large scale. The preferred ratio of sulfuric acid to ore concentrate used in the reaction is essentially constant, regardless of the scale of the process. When the process is run on small scale, about 50 mL of 85% sulfuric acid is reacted with about 10 g of ore concentrate having a copper concentration of about 28%.

This first step of a preferred embodiment of the inventive process achieves essentially complete conversion of metals and metal complexes in the ore concentrate to various metal sulfates. The iron in the ore concentrate may be converted to one or more of ferrous sulfate, ferric sulfate and jarosite, and if ammonium ion is present, then ferric ammonium sulfate and ammonium jarosite may also form. Typically, a mixture of these iron sulfates is formed.

In a second step, the acid solution of metal sulfates and the residual ore concentrate (tailings) are contacted with ammonium nitrate. This contacting may occur in the same reaction vessel as occurred the leaching of metal into the sulfuric acid, or the entire mixture of sulfuric acid, metal sulfate and residual ore concentrate may be transferred to a different reaction vessel specifically fitted to collect and recover the $NO_x$ (i.e., nitrogen oxide) gases that are evolved in this second step. Upon contact with ammonium nitrate, the ferric sulfate, ferrous sulfate and/or jarosite is converted to ammonium jarosite and/or ferric ammonium sulfate.

The ammonium nitrate is preferably added to the acid solution of metal sulfates in the form of an aqueous ammonium nitrate solution. When using about 10 g of ore concentrate and about 50 mL sulfuric acid as described above, a suitable aqueous ammonium nitrate solution is prepared by dissolving about 1.5 g ammonium nitrate in about 30 mL of water, and adding this entire solution to the acid solution of metal sulfates. Ammonium nitrate, which is a commodity chemical very commonly used as a fertilizer, can be obtained from a number of suppliers. Fertilizer grade ammonium nitrate is suitably employed in the inventive process, and can be obtained from a large number of supply houses or even garden centers.

Before adding the ammonium nitrate solution, the mixture of sulfuric acid, metal sulfates and residue ore concentrate may be cooled to temperature of about 90° C. to about 180° C., preferably about 130° C. to about 150° C. The ammonium nitrate addition to the sulfuric acid is typically exothermic, and thus if the initial temperature is about 130° C., the exothermicity of the reaction will typically raise the reaction temperature to about 150° C. A reaction time of about 2 minutes to about 15 minutes, and preferably about 3 minutes to about 7 minutes is suitable for converting most, if not all of the ferrous sulfate, ferric sulfate and/or jarosite to ferric ammonium sulfate and/or ammonium jarosite. Agitation is preferably supplied while ammonium nitrate is being contacted with the metal sulfate solution.

In a third step, nitric acid is added to the product formed in the second step of the preferred inventive process. It is preferred that the nitric acid solution be a dilute solution in water. Thus, when starting with about 10 g of ore concentrate and using the amounts of sulfuric acid and ammonium nitrate as set forth above, a suitable dilute nitric acid solution (all of which is added to the product of the second step of the process) can be prepared from approximately 2 mL of concentrated nitric acid and approximately 30 mL of water, to produce an approximately 1M aqueous nitric acid solution. A preferred dilute nitric acid solution has a concentration of about 0.2M to about 5M. More preferably, the nitric acid solution has a concentration of about 0.75M to about 1.5M, and about 20 mL to about 40 mL of such a nitric acid solution is added to the leaching solution from about 10 g of ore concentrate.

Prior to adding the nitric acid, the product mixture from the second step of the above-described process is cooled to a temperature of about 10° C. to about 150° C., preferably about 30° C. to about 100° C., and more preferably about 60° C. to about 80° C. Agitation is also preferably supplied while the nitric acid is contacted with the product mixture from the second step. In a preferred process, the nitric acid is sprayed onto the mixture from the second step. Within this more preferred temperature range, and if agitation is supplied, a reaction time of about 5 minutes to about 30 minutes, preferably about 10 minutes to about 20 minutes, is suitable to achieve essentially complete conversion of ammonium jarosite and/or ferric ammonium sulfate to ferric sulfate.

Under the conditions set forth above for the third step of the preferred inventive process, the ammonium jarosite and/or ferric ammonium sulfate formed in the second step is essentially completely converted to ferric sulfate and may be recovered. A preferred recovery process begins by removing water from the mixture, by distillation or low pressure steam, to raise the concentration of the acid. Neither the ferric sulfate nor any other metal sulfate is soluble in the very high strength acid formed by the dehydration process. Thus, the liquid acid can be separated from the residue comprising solid ferric sulfate and tailings, using any solid/liquid separation technique, including centrifugation or filtration, employed in the art. The acid can be recycled and used again in the leaching process.

The residual solid left after the solid/liquid separation contains ferric sulfate, other metal sulfate such as copper sulfate, and tailings. Because ferric sulfate (unlike most other metal sulfates) is not very soluble in water, the addition of cool water to this solid residue solubilizes the metal sulfates other than ferric sulfate. Cool water (i.e., water having a temperature of not more than about 30° C.), is preferably employed in order that solubilization of the ferric sulfate is minimized. Thereafter, a standard solid/liquid separation technique can be used to separate the solution of metal sulfate (e.g., copper sulfate or zinc sulfate), from the ferric sulfate and tailings. The solution of copper sulfate and/or zinc sulfate is thereby quite low in iron content, typically having an iron content of less than 3 g iron/liter solution, and thus is suitably directed into an electrowinning process for recovery of the copper and/or zinc.

The ferric sulfate can be separated from the tailings by combining these materials with steam or very hot water, to thereby solubilize the ferric sulfate but not the tailings. Then, after another standard solid/liquid separation, there is obtained a hot solution of ferric sulfate separate from the tailings. Upon cooling, ferric sulfate will precipitate from the solution of ferric sulfate, and can be readily isolated by a solid/liquid separation technique.

From the foregoing it will be appreciated that, although specific embodiments of the invention have been described herein for purposes of illustration, various modifications may be made without deviating from the spirit and scope of the invention. Accordingly, the invention is not limited except as by the appended claims.

We claim:

1. A method for producing ferric sulfate, comprising contacting (i) an iron complex comprising ions of iron, ammonium and sulfate, with (ii) nitric acid, to thereby form ferric sulfate.

2. The method of claim 1 wherein the iron complex is selected from ferric ammonium sulfate and ammonium jarosite, in aqueous or non-aqueous forms.

3. The method of claim 1 wherein the nitric acid, prior to being contacted with the iron complex, is diluted in water to a concentration of about 0.2M to about 5M.

4. The method of claim 3 wherein the nitric acid is diluted in water to a concentration of about 0.7M to about 1.5M.

5. The method of claim 1 wherein the iron complex is contacted with nitric acid at a temperature of about 10° C. to about 150° C.

6. The method of claim 1 wherein the iron complex is contacted with nitric acid at a temperature of about 30° C. to about 100° C.

7. The method of claim 1 wherein the iron complex is contacted with nitric acid at a temperature of about 60° C. to about 80° C.

8. The method of claim 1 wherein the iron complex and the nitric acid are agitated while being contacted.

9. The method of claim 1 wherein the iron complex is dissolved in water to form an aqueous phase prior to being contacted with nitric acid.

10. The method of claim 9 wherein the aqueous phase has a pH of less than 7.

11. The method of claim 10 wherein the aqueous phase further comprises sulfuric acid.

12. The method of claim 10 wherein the aqueous phase further comprises a metal sulfate selected from copper sulfate and zinc sulfate.

13. The method of claim 10 wherein the aqueous phase further comprises sulfuric acid and a metal sulfate selected from copper sulfate and zinc sulfate.

14. The method of claim 13 wherein the aqueous phase is formed by a process of adding ammonium nitrate to a solution of water, sulfuric acid and iron sulfate, in order to convert iron sulfate to the iron complex.

15. The method of claim 14 wherein ammonium nitrate is added to the solution at a temperature of about 90° C. to about 180° C.

16. The method of claim 14 wherein the ammonium nitrate is added to the solution at a temperature of about 130° C. to about 150° C.

17. The method of claim 14 wherein the ammonium nitrate is dissolved in water prior to being added to the solution.

18. The method of claim 14 wherein the iron sulfate is ferrous sulfate, ferric sulfate or jarosite.

19. The method of claim 14 wherein the solution is formed by a process of contacting the sulfuric acid with a feedstock selected from ore and ore concentrate.

20. The method of claim 19 wherein the feedstock is ore concentrate comprising copper or zinc at a content of about 25% to about 50%, as measured by weight of copper or zinc in the total weight of feedstock, said feedstock additionally comprising iron.

21. The method of claim 19 the feedstock has a particle size of about 200 mesh to about 400 mesh.

22. The method of claim 19 wherein the sulfuric acid is at least about 85 weight percent in water, based on the total weight of water and sulfuric acid.

23. The method of claim 22 wherein the sulfuric acid and the feedstock are contacted at a temperature and for a time sufficient to achieve formation of iron sulfate.

24. The method of claim 22 wherein the sulfuric acid and the feedstock are contacted at a temperature of about 195° C. to about 210° C.

25. The method of claim 22 wherein the sulfuric acid and the feedstock are contacted for a time of about 5 minutes to about 25 minutes.

26. The method of claim 22 wherein the sulfuric acid and the ore concentrate are combined in a proportion of about 50 mL 85% sulfuric acid and about 10 g ore concentrate.

27. The method of claim 26 wherein the ore concentrate and the sulfuric acid are contacted for about 5 minutes to about 25 minutes at a temperature of about 195° C. to about 210° C. to form a solution of iron sulfate and tailings comprising undissolved ore concentrate.

28. The method of claim 27 wherein the solution of iron sulfate is contacted with aqueous ammonium nitrate formed from about 2 parts ammonium nitrate and about 30 parts water, in a proportion of about 30 mL aqueous ammonium nitrate to about 10 g of ore concentrate and about 50 mL of 85% sulfuric acid.

29. The method of claim 27 wherein the solution of iron sulfate is contacted with aqueous ammonium nitrate at a temperature of about 90° C. to about 150° C. to form a solution of ammonium jarosite and/or ferric ammonium sulfate.

30. The method of claim 29 wherein the solution of ammonium jarosite and/or ferric ammonium sulfate is contacted with about 20 mL to about 40 mL aqueous nitric acid having a concentration of about 0.75M to about 1.5M, at a temperature of about 60° C. to about 80° C. for a time sufficient to form ferric sulfate solution.

31. The method of claim 30 wherein the ferric sulfate solution is subjected to dehydration to form a strongly acidic solution, and the ferric sulfate and other metal sulfates present in the ferric sulfate solution precipitate from the strongly acidic solution.

32. The method of claim 31 wherein the strongly acidic solution is separated from the tailings and precipitate of ferric sulfate and other metal sulfates by a solid/liquid separation technique.

33. The method of claim 32 wherein the tailings and precipitate of ferric sulfate and other metal sulfates are treated with water, and the other metal sulfates substantially dissolve in the water while the ferric sulfate and tailings remains substantially undissolved in the water.

34. The method of claim 33 wherein the metal sulfates substantially dissolved in the water are separated from the ferric sulfate and tailings by a process of solid/liquid separation.

35. The method of claim 34 wherein the separated metal sulfates substantially dissolved in the water are treated to recover metal.

36. The method of claim 35 wherein electrowinning is used as the treatment to recover the metal.

37. The method of claim 33 wherein (i) the ferric sulfate is isolated from the tailings by a process of contacting the ferric sulfate and the tailings with hot water and/or steam, to form substantially dissolved ferric sulfate and substantially undissolved tailings, and (ii) a solid/liquid separation technique is used to separate the substantially dissolved ferric sulfate from the substantially undissolved tailings.

38. In a process for leaching metal from ore concentrate with a sulfuric acid leaching solution, wherein the leaching solution contains at least one of ferric ammonium sulfate and ammonium jarosite, the improvement comprising adding nitric acid to the leaching solution and thereby forming ferric sulfate.

* * * * *